United States Patent
Evans, Sr.

(10) Patent No.: US 7,915,760 B2
(45) Date of Patent: Mar. 29, 2011

(54) ELECTRIC POWER CONSERVATION SYSTEM FOR STORING ELECTRIC POWER FOR USE DURING OFF-PEAK HOURS

(76) Inventor: Bruce Jonathan Evans, Sr., Baltimore, MD (US)

( * ) Notice: Subject to any disclaimer, the term of this patent is extended or adjusted under 35 U.S.C. 154(b) by 110 days.

(21) Appl. No.: 12/327,774

(22) Filed: Dec. 3, 2008

(65) Prior Publication Data
US 2009/0152952 A1    Jun. 18, 2009

Related U.S. Application Data

(60) Provisional application No. 60/996,955, filed on Dec. 12, 2007.

(51) Int. Cl.
*H02J 1/12* (2006.01)
(52) U.S. Cl. ............... 307/46; 307/43; 307/44; 307/45; 307/64; 307/65; 307/66
(58) Field of Classification Search .................... 307/43, 307/44, 45, 46, 64, 65, 66
See application file for complete search history.

(56) References Cited

U.S. PATENT DOCUMENTS

| | | | |
|---|---|---|---|
| 4,158,163 A | 6/1979 | Eriksen et al. | |
| 4,164,785 A | 8/1979 | Young et al. | |
| 4,642,475 A | 2/1987 | Fischer et al. | |
| 4,672,520 A | 6/1987 | Ueda et al. | |
| 4,760,483 A * | 7/1988 | Kugelman et al. | 361/13 |
| 4,985,819 A | 1/1991 | Mori et al. | |
| 5,058,710 A | 10/1991 | Iwasa | |
| 5,315,497 A | 5/1994 | Severinski | |
| 5,767,591 A | 6/1998 | Pinkerton | |
| 6,098,175 A | 8/2000 | Lee | |
| 6,111,764 A | 8/2000 | Atou et al. | |
| 6,115,268 A | 9/2000 | Chang et al. | |
| 6,448,838 B1 * | 9/2002 | Heim et al. | 327/365 |
| 6,455,954 B1 * | 9/2002 | Dailey | 307/66 |
| 7,266,962 B2 * | 9/2007 | Montuoro et al. | 62/236 |
| 2004/0066094 A1 * | 4/2004 | Suzuki et al. | 307/18 |
| 2007/0200433 A1 * | 8/2007 | Kelty | 307/66 |
| 2008/0238196 A1 | 10/2008 | Yan et al. | |

FOREIGN PATENT DOCUMENTS

JP    2006-271097    10/2006

* cited by examiner

*Primary Examiner* — Jared J Fureman
*Assistant Examiner* — Justen Fauth
(74) *Attorney, Agent, or Firm* — Swift Law Office; Stephen Christopher Swift

(57) ABSTRACT

An electric power conservation system to be used between an AC utility power source and a load circuit in a home or business. The electric power conservation system comprises an energy charger component, a DC rechargeable energy source, an inverter unit, a bypass isolation circuit, a monitor and control unit, coil contactors and contacts, and necessary circuitry for supplying a load circuit with the power it requires. The invention reduces consumption of electric power from public utility companies, thereby decreasing the load on the national electrical grid. Where utility companies offer lower off-peak rates to consumers of electrical power, it becomes exceedingly desirable to have such a system in place, to save consumers money. During normal operations wherein normal utility power is available, the load circuit derives part of its power from the AC utility power source, and the remaining power that it requires from the electric power conservation system.

3 Claims, 4 Drawing Sheets

ELECTRIC POWER CONSERVATION SYSTEM FOR STORING ELECTRIC POWER FOR USE DURING OFF-PEAK HOURS

CROSS REFERENCE TO RELATED APPLICATION

This application is based on and claims the benefit of Provisional Patent Application Ser. No. 60/996,955, filed Dec. 12, 2007, which is incorporated herein by reference.

BACKGROUND OF THE INVENTION

1. Field of the Invention

The present invention relates to an electric power conservation system, and more specifically, how a system comprised of a DC rechargeable energy source, an energy charger component, an inverter unit, a bypass isolation circuit, and a monitor and control unit can be configured to supply a load circuit, located in industrial, commercial, and residential dwellings, with the power that is required and demanded, while conserving the power supplied by an AC utility power source. Also, a cost savings can be experienced by industrial, commercial and residential users of electric power. When utility companies offer off-peak rates to consumers of electrical power, it becomes exceedingly desirable to have such a system in place.

2. Description of the Prior Art

Currently, to the extent that power conservation units exist, such systems are elaborate. Examples are, solar panel systems and wind powered systems, which require an extensive amount of labor to install, and are aesthetically unattractive. These systems often involve additional circuitry and hardware for supplying some degree of power back to the utility power source. Consequently, such systems are prohibitively expensive.

For many years consumption of electric power in the industrialized counties has been mainly based on the burning of fossil fuels and has spiraled to the point where consumers are seeking alternative sources to power their homes, factories, etc. The electric power conservation system introduced here addresses this issue in a way to get more out of a limited resource as well as any new source of power generation that emerges. The electric power conservation system optimizes the use of a utility power source, consequently reducing the expense paid by consumers for using the utility power source, and as a result, conserving the utility power source.

The preferred embodiments introduced here encompass three types of systems, a stand-alone, an integrated, and a service entry system. Scaleable systems can be installed at the service entry of residential, commercial, and industrial buildings. An even smaller system comprised of an energy charger component, a DC rechargeable energy source, a bypass isolation circuit, a monitor and control unit, an inverter unit, and other necessary circuitry can be integrated into appliances. Additionally, a stand alone system is contemplated that can be used between an AC outlet within residential, commercial, and industrial dwellings, and equipment requiring power.

Currently, the national electrical grid is being utilized nearly to its maximum capacity, and the cost of generating power for residential, commercial, and industrial use is increasing. While the exploration and development of new sources of energy, such as hydrogen, solar, biofuels, geothermal, and wind is being conducted, the apparent limitations surrounding the use of fossil fuels are being realized. The efficient use of energy, whatever the source, now and always, is critical. To this end, an electric power conservation system is being introduced herein.

U.S. Pat. No. 4,158,163, issued on Jun. 12, 1979, to Henry R. Eriksen and Hans M. Beierholm, discloses an inverter circuit for operating an asynchronous motor having an adjustable speed, that converts AC to DC and then back again to AC.

U.S. Pat. No. 4,164,785, issued on Aug. 14, 1979, to Thomas A. Young and Jay W. Gustin, discloses a multiphase to single phase and frequency converter system, that converts AC to DC and then back again to AC.

U.S. Pat. No. 4,642,475, issued on Feb. 10, 1987, to Dietmar Fischer and Christian Kublick, discloses an uninterruptible power supply ("UPS") which converts AC to DC to charge a storage battery, and then converts DC from the battery back to AC when the normal source of AC is interrupted.

U.S. Pat. No. 4,672,520, issued on Jun. 9, 1987, to Shigeta Ueda et al., discloses a current-source power converting apparatus with self-extinction devices, that converts AC to DC and then back again to AC, and that supplies power from a battery intermittently when the normal AC power source fails.

U.S. Pat. No. 4,985,819, issued on Jan. 15, 1991, to Haruyoshi Mori and Nobuo Sashida, discloses an AC to DC to AC apparatus having a battery charging and discharging feature, employed in a non-failure power unit and the like.

U.S. Pat. No. 5,058,710, issued on Oct. 22, 1991, to Masao Iwasa, discloses an elevator power source device, to provide power to elevators during a power failure, that converts AC to DC, and converts stored DC to AC during a power outage.

U.S. Pat. No. 5,315,497, issued on May 24, 1994, to Alex J. Severinsky, discloses a power conditioner that inputs AC power having distortion and noise, converts it to DC that is stored in capacitors, and then converted to clean AC power without the distortion and noise.

U.S. Pat. No. 5,767,591, issued on Jun. 16, 1998, to Joseph F. Pinkerton, discloses a method and apparatus for providing startup power to a diesel-generator-backed uninterruptible power supply, that converts AC to DC and back again to AC.

U.S. Pat. No. 6,098,175, issued on Aug. 1, 2000, to Howard Hong-Dough Lee, discloses an energy-conserving power-supply system using keep-alive DC power to consistently power a control circuit so as to make a main power supply readily usable for either distributing AC power or supplying regulated DC power.

U.S. Pat. No. 6,111,764, issued on Aug. 29, 2000, to Satoshi Atou, Haruhiko Ikeda and Hitoshi Mikami, discloses converts AC to DC and back again to AC.

U.S. Pat. No. 6,111,764, issued on Aug. 29, 2000, to Satoshi Atou, Haruhiko Ikeda and Hitoshi Mikami, discloses conversion of AC to DC and back again to AC.

U.S. Patent Application Publication No. 2008/0238196, published on Oct. 2, 2008, to Chao Yan et al., discloses an energy recycle system for use with an AC power supply. AC power is rectified to DC and filtered to remove high-frequency harmonics, and then converted back to AC and returned to the utility grid.

Japanese Patent No. 2006-271097, published on Oct. 5, 2006, inventors Toshio Inoue and Kazuyuki Kodera, discloses an uninterruptible power supply, in which AC power is rectified into DC power and stored in a battery. When there is a power failure, the DC power from the battery is inverted back into AC.

Note that none of the references cited above disclose the routine use of converting AC to DC that is stored in a battery, then converted back to AC, to conserve power during normal operation of a home or business when there is not a power failure or interruption. None of the above inventions and patents, taken either singly or in combination, is seen to describe the instant invention as claimed.

SUMMARY OF THE INVENTION

The present invention is an electric power conservation system connected between an AC utility power source and a load circuit. The electric power conservation system includes a DC rechargeable energy source, an energy charger component, an inverter unit for changing the stored DC energy into AC power, a method to deactivate and reactivate the system's active components as the availability of utility power dictates, a bypass method to disconnect the electric power conservation system's active components from the load circuit and to connect the utility power directly to the load circuit; in the event that it would be necessary, a monitor and control method to optimize utility power usage, and circuitry necessary for supplying electric power derived from both sources; the available utility power; and the stored inverted power, to the load circuit. During normal operations when normal AC utility power is available, and the bypass is not engaged, the load circuit draws its power from the active components of the electric power conservation system, and the power drawn from the available utility is only an amount to keep the DC energy storage source within a preset threshold level. The degree to which power is drawn from the system's active components, and thus, the reduced amount of utility power usage, is a function of the overall power capacity of the system, and the efficient management of the monitor and control method. Additionally, while under light to medium load conditions, the load circuit can be supported entirely by the electric power conservation system without the need for any utility power. This stand alone feature, however, will only engage for a period of time not to exceed the storage capacity discharge rate limit. The overall result in any mode of use, is a conservation for industrial, commercial, and residential users of electric utility power, as well as a decreased load on the national electrical grid.

Accordingly, it is a first object of the invention to produce an electric power conservation system that supplies a load circuit with the power it requires, as might be demanded by industrial, commercial, and residential users of electric utility power, while simultaneously conserving the power supplied by an AC utility power source, and thereby decreasing the load on the national electrical grid.

It is a second object of the invention to provide an electric power conservation system that employs a DC rechargeable energy source, employs a method to keep said DC rechargeable energy source charged, employs a method of inverting the DC energy into AC energy, employs a monitor and control component which optimizes to achieve the minimum consumption of electric utility power from a public utility, by exploiting the use and efficient management of the elements comprising the system, and, has provisions to connect to an AC utility source on the input side of the system and provision to connect to a load circuit on the output side of the system.

It is a third object of the invention to provide an electric power conservation system with provisions incorporated to add increased capabilities, additional DC rechargeable energy source, additional charging capacity, and additional inverting capacity.

It is a fourth object of the invention to provide an electric power conservation system that includes methods to automatically deactivate the energy conservation system's active components from the load circuit, if the utility power becomes unavailable for an extended period to time, and includes methods to automatically reactivate the system's active components once utility power is available.

It is a fifth object of the invention to provide an electric power conservation system that includes a bypass method to disconnect the electric power conservation system's active components from the load circuit and to connect the utility power directly to the load circuit, in the event that it would be necessary.

It is a sixth object of the invention to provide an electric power conservation system comprising, but not limited to, three configurations. First, a stand-alone system which can be plugged into any standard AC outlet is offered. Second, an integrated system which would be incorporated into an appliance such as an oven, dish washer, or refrigerator is offered. Third, a service entry system is offered, which would be installed at the service entry of industrial, commercial, and residential locations, and integrated within the wiring thereof.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

To the accomplishment of the above and related objects, the invention may be embodied in the form illustrated in the accompanying drawings. Attention is called to the fact, however, that the drawings are illustrative only. Variations in addition to the three discussed above are contemplated as being part of the invention, limited only by the scope of the claims.

Similar reference characters denote corresponding features consistently throughout the attached drawings.

DETAILED DESCRIPTION OF THE PREFERRED EMBODIMENTS

Figure 1:
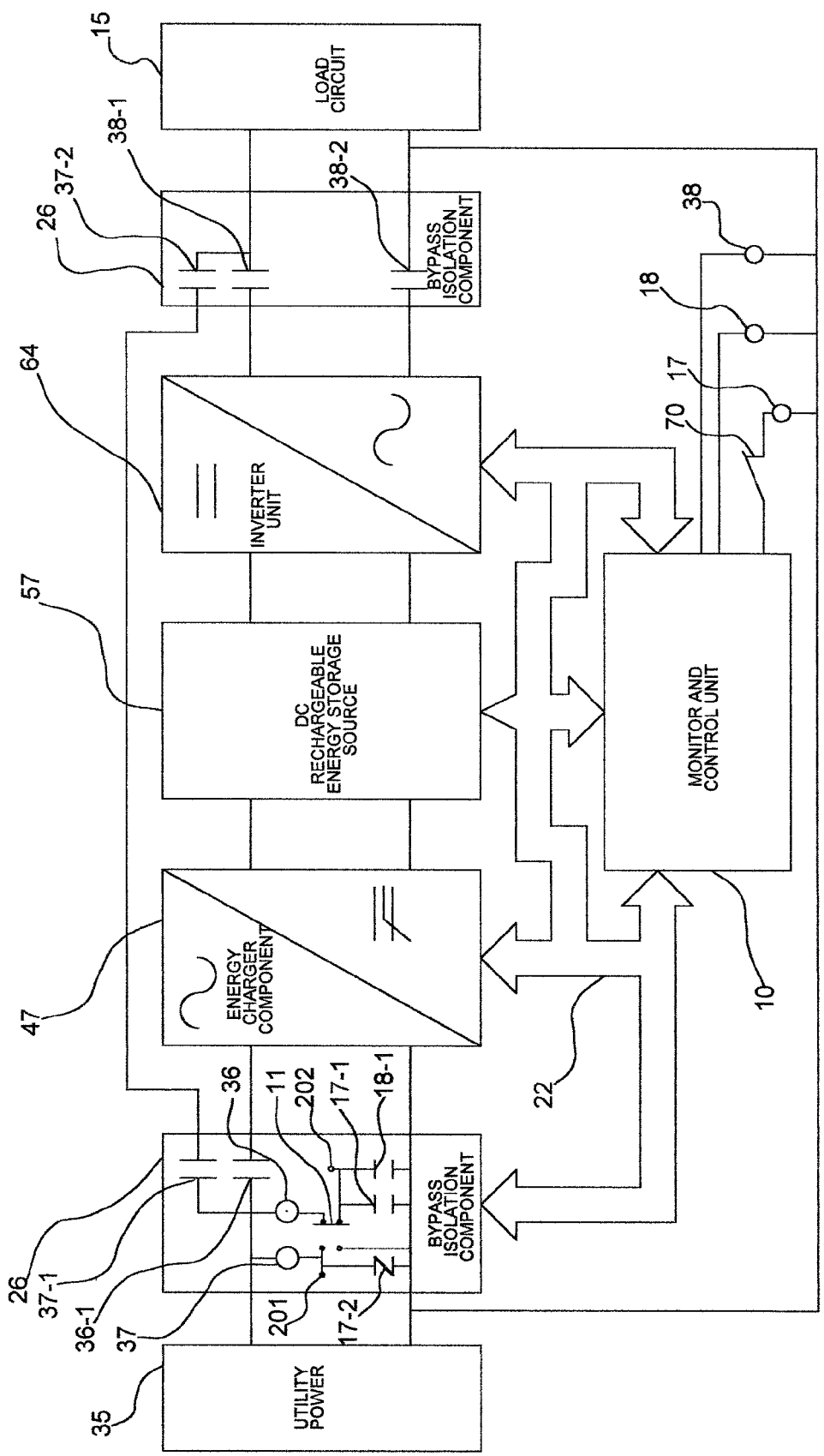
FIG. 1 is a schematic diagram of the first preferred embodiment of the present invention.

FIG. 1 schematically illustrates an electric power conservation system in accordance with the principles of the present invention, showing a utility power source 35 supplying 120 VAC electrical power to a load circuit 15 through separate current paths, a bypass current path, and an energy conservation current path. The electric power conservation system can automatically and manually switch between the bypass current path and the energy conservation current path. When the energy conservation current path is active, the demand of the load circuit 15 causes currents of different magnitudes to flow in a energy charger component 47, a DC rechargeable energy source 57, and an inverter unit 64 that are connected in series. As will be seen in the following paragraphs, the electric power conservation system is designed to minimize the amount of power supplied by the utility power source 35 and maximize the power supplied by the DC rechargeable energy source 57 that is included in the system. A monitor and control unit 10 assures that energy conservation is optimized through the efficient management of the system resources and that the minimum amount of current is supplied by the utility power source 35. The monitor and control unit 10 in this embodiment is of the type that has a programmed software routine that supervises the operation of the system resources in such a way as to minimize the amount of power provided by the utility power source 35.

The electric power conservation system includes a bypass isolation circuit 26 that can be controlled manually and automatically, to activate and deactivate the required current path, as the system's conditions may dictate. The monitor and control unit 10 included in the electric power conservation system, is powered by and connected to the DC rechargeable energy source 57, utilizing a interconnecting cable 22. The monitor and control unit 10 in this embodiment supervises the operation of the system's resources through said interconnecting cable 22. A toggle switch 70 is incorporated and is connected between a coil contactor 17 and the monitor and control unit 10. The toggle switch 70 is used to disengage and engage the monitor and control unit 10. To illustrate, when the toggle switch 70 is opened, the monitor and control unit 10 is disengaged, and only the bypass current path can be utilized to provide power to the load circuit 15. A normally closed contact 17-2 (operated by coil contactor 17) in the bypass isolation circuit 26, is connected in series with a coil contactor 37, and provides an energizing current path for the coil contactor 37. Also shown is a connection point 201 between the normally closed contact 17-2 and the coil contactor 37 that is used as a monitoring point for the monitor and control unit 10. A normally open contact 37-1 (operated by coil contactor 37) and a normally open contact 37-2 (operated by coil contactor 37), are connected together in series and are situated between the utility power source 35 and the load circuit 15, and when both are closed, allow the utility power source 35 to furnish the load circuit 15 with the required power, through the bypass current path. When the toggle switch 70 is in the closed position, the monitor and control unit 10 is engaged, and executes an initial condition system check. Upon determining that the energy conservation current path is in a readiness state, the monitor and control unit 10, produces a stimulus signal that energizes the coil contactor 17. A normally opened contact 17-1 (operated by coil contactor 17) in the bypass isolation circuit 26 is connected in series with a coil contactor 36, and provides an energizing current path for the coil contactor 36. A connection point 202 between the normally open contact 17-1 and the coil contactor 36, is used as monitoring point for the monitor and control unit 10. A normally open contact 36-1 (operated by coil contactor 36), shown in the bypass isolation circuit 26, is connected between the utility power source 35 and the energy charger component 47, and is used to provide the electric connection therebetween during normal operations. To illustrate, once the stimulus signal energizes coil 17, the normally open contact 17-1 closes, providing a path to energize coil contactor 36 which in turn closes the normally open contact 36-1 to allow the utility power source 35 to supply current to the energy charger component 47 in the energy conservation current path. Such current, as supplied by the utility power source 35, is significantly less than the maximum current required by the load circuit 15.

FIG. 1 further illustrates a normally open contact 38-1 and a normally open contact 38-2 (each operated by a coil contactor 38, described below) are connected from the output of the inverter unit 64 to the load circuit 15 and provide an electric connection therebetween during normal operation. Additionally, after some predetermined time (provided by the programmed software routine) a stimulus signal from the monitor and control unit 10 is produced and made available to an energized a coil contactor 38. Once coil contactor 38 is energized, the normally open contact 38-1 and the normally open contact 38-2 close, to complete the energy conservation current path from the utility power source 35 to the load circuit 15. When the energy conservation current path is functioning, the load circuit 15 will cause currents of varying degrees to flow in the energy charger component 47, the DC rechargeable energy source 57, and the inverter unit 64. The monitor and control unit 10 assures that energy conservation is realized through the efficient management of the system resources and that the minimum amount of current is supplied by the utility power source 35. There might be additional components, hardware, firmware, software, and other such comparable means and methods employed to make and maintain the connections, interactions, and accomplish the overall purpose illustrated and articulated herewith, as these have been contemplated.

FIG. 1 shows that the output of the energy charger component 47 is connected to the DC rechargeable energy source 57, which in turn is connected to the input of the inverter unit 64. These three components working in tandem, and managed by the monitor and control unit 10, comprise the essential electric power conservation components. Though FIG. 1 illustrates the first preferred embodiment of the present invention, consisting of the energy charger component 47, the DC rechargeable energy source 57, the inverter unit 64, the monitor and control unit 10, the bypass isolation circuit 26, a bypass current path, interconnecting cable 22, and an additional switch and coil contactors, it should not be construed as the only embodiment contemplated. To provide significant energy conservation, a typical embodiment might only consist of the energy charger component 47, the DC rechargeable energy source 57, the inverter unit 64, and means of connection to inverter unit 64, and means of connection to the utility power source 35 and the load circuit 15, as illustrated.

FIG. 1 schematically Illustrates that the bypass isolation circuit 26 includes a coil contactor 37, a manual bypass switch 11 (manually engaged, mechanically held), and an energizing connection point path, each of these elements become connected together in series when the manual bypass switch 11 is engaged (set to bypass position). With the manual bypass switch engaged (set to bypass position), an energizing current path for the coil contactor 37 is complete. Subsequently, a normally open contact 37-1 (operated by the coil contactor 37), and a normally open contact 37-2 (operated by the coil contactor 37), each close, permitting only the bypass current path to provide the load circuit 15 with power from the utility power source 35, during the manual bypass operation. Other suitable means might be employed to safely accomplish such interactions, and are well known to persons of ordinary skill in the art.

FIG. 1 additionally shows that along the energy conservation current path, as illustrated, the utility power source 35 is connected to the input side of a normally open contact 36-1 (operated by the coil contactor 36) of the bypass isolation circuit 26. The output side of the normally open contact 36-1 (operated by the coil contactor 36) of the bypass isolation circuit 26 is connected to a energy charger component 47. The output from the energy charger component 47 is connected to a DC rechargeable energy source 57, where it is in turn connected to the input of a inverter unit 64. The hot side of the output from the inverter unit 64 is connected to input side of a normally open contact 38-1 (operated by the coil contactor 38) of the bypass isolation circuit 26. The neutral side of the output from the inverter unit 64 is connected to input side of a normally open contact 38-2 (operated by the coil contactor 38) of the bypass isolation circuit 26. The output side of the normally open contact 38-1 (operated by the coil contactor 38) of the bypass isolation circuit 26 is connected directly to the hot side of the load circuit 15. The output side of the normally open contact 38-2 (operated by the coil contactor 38) of the bypass isolation circuit 26 is connected directly to the neutral side of the load circuit 15. The bypass isolation circuit 26, the output of the utility power source 35, the input of the energy charger component 47, and the load circuit 15 each share a common neutral VAC connection. The output of the energy charger component 47, the DC rechargeable energy source 57, and the input of the inverter unit 64 each share a DC common positive connection point and a DC common negative connection point. During the energy conservation mode of operation, the neutral side of the inverter unit 64 and the neutral side of the load circuit 15, share a common point once the contact 38-2 has been commanded to close.

The bypass isolation circuit 26 in this embodiment employs a "break-before-make" means, but it should be noted that any other suitable means for safely switching between the energy conservation current path and the bypass current path may be employed.

The monitor and control unit 10 in this embodiment is of the type that has a software routine programmed into it. It should be noted here that other suitable means for accomplishing interaction between the major elements of the electric power conservation system may be employed, as such methods would be appreciated and well known by those persons skilled in art. In addition to its other functions, as will be discussed below, the monitor and control unit 10 is utilized to sense the availability of power from the utility power source 35. In this embodiment such sensing is accomplished through the interconnection means 22, as is located between the monitor and control unit 10 and the bypass isolation circuit 26, and by the software routine within the monitor and control unit 10. There might be additional components and hardware necessary to make and maintain such connections as would be well known to persons familiar with the art. The monitor and control unit 10 is also utilized to monitor and control parameters within the energy charger component 47. In this embodiment the AC input current that is drawn by the energy charger component 47, and the DC output current supplied to the DC rechargeable energy source 57 is sensed by the monitor and control unit 10. Similarly, the charging rate that the energy charger component 47 is allowed to charge the DC rechargeable energy source 57 is determined and supplied by the monitor and control unit 10. Also, the monitor and control unit 10 is utilized to switch on and switch off the energy charger component 47. In this embodiment such sensing and sourcing is achieved by the software routine and the interconnection means 22, as is located between the control unit 10, the bypass isolation circuit 26, and the DC rechargeable energy source 57. There might be additional components and hardware necessary to make, maintain, and operate such interaction between the monitor and control unit 10 and the energy charger component 47. It should be noted here that other suitable means for accomplishing such interaction between the monitor and control unit 10 and the energy charger component 47 may be employed. Additionally, the monitor and control unit 10 is utilized to monitor and control critical parameters of the inverter unit 64. The DC current drawn by the inverter unit 64, the AC output current supplied to the load circuit 15 by the inverter unit 64, and other parameters necessary for the correct and efficient operation of the electric power conservation system are sensed and supplied by the monitor and control unit 10. The ability to switch on and switch off the inverter unit 64 can also be accomplished by the monitor and control unit 10. In this embodiment such sensing and sourcing is achieved by the software routine, and through the interconnection means 22, as is located between the monitor and control unit 10 and the inverter unit 64. There might be additional components and hardware necessary to make, maintain, and operate such interaction between the monitor and control unit 10 and the inverter unit 64. It should be noted here that other suitable means for accomplishing such interaction between the monitor and control unit 10 and the inverter unit 64 may be employed. Further, the monitor and control unit 10 is utilized to sense the DC output directly at the DC rechargeable energy source 57. In this embodiment such sensing is achieved by the software routine and through the interconnection means 22, as is located between the monitor and control unit 10 and the DC rechargeable energy source 57. Here, it should be noted that if the voltage of DC rechargeable energy source 57 cannot be brought within a set of predetermined levels within a specified time, by the energy charger component 47, then the electric power conservation system defaults to the bypass current path. There may be additional components and hardware necessary to make, maintain, and operate such interaction between the monitor and control unit 10 and the DC rechargeable energy source 57. It should be noted here that other suitable means for accomplishing such interaction between the monitor and control unit 10 and the DC rechargeable energy source 57 may be employed.

The operation of the electric power conservation system will now be described. The energy conservation current path of the utility power source 35 occurs through and between closed contacts 36-1, 38-1 and 38-2 of the bypass isolation circuit 26. During normal operations, the manual bypass switch 11 is not engaged (set to normal position), the monitor and control unit 10 is powered from the DC rechargeable energy source 57, and the toggle switch 70 is closed. When the monitor and control unit 10 determines that the system is in a readiness state a stimulus signal is produced and made available to energized coil contactor 17 and coil contactor 38. When coil contactor 17 becomes energized the normally open contact 17-1 (operated by coil contactor 17) closes and supplies the current path to energize a coil contactor 36. Similarly, when coil contactor 38 becomes energized, the normally open contacts 38-1 and 38-2 close, establishing a connection path from the energy conservation path to the load circuit 15. Once the coil contactor 36 becomes energized a normally open contact 36-1 closes permitting the current from the AC utility power 35 to flow to the energy charger component 47 where it is converted to DC. When the minimum lower threshold voltage of the DC rechargeable energy source 57 has been reached, the DC current flow that is output from the energy charger component 47 is supplied to the DC rechargeable energy source 57 to bring the DC rechargeable energy source 57 within the specified predetermined levels and limits. The output of the DC rechargeable energy source 57 continuously flows to supply the inverter unit 64 with the DC power required so that is can perform the task of inverting DC power into AC power. The inverted power from the inverter unit 64 is output as AC power and is used to supply the load circuit 15 with the required AC power as demand might dictate. Before arriving at the load circuit 15, the AC power generated by the inverter unit 64 flows through the closed contacts 38-1, and 38-2 of the bypass isolation circuit 26 and then directly to the load circuit 15, and thus completes the electric power conservation system's normal operating power current path mode.

While in this operating mode, the monitor and control unit 10 is collecting and supplying parameters throughout the system. The current and voltage supplied to the load circuit 15, the DC voltage at the DC rechargeable energy source 57, the AC utility voltage and current, and the instantaneous charging rate supplied by the energy charger component 47 to the DC rechargeable energy source 57, are among the parameters that are captured, evaluated and supplied, by the monitor and control unit 10, as it determines the appropriate real time adjustment setting for the energy charger component 47. Once adjusted, which could result in a command to switch off the energy charger component 47, the DC output from the energy charger component 47 is supplied to the DC rechargeable energy source 57 to bring the DC rechargeable energy source 57 within the specified predetermined levels and limits. Simultaneously, an efficiency reading is available from the monitor and control unit 10. If the energy charger component 47 is commanded to switch off, the electric power conservation system is operating at peak efficiency and no current is being drawn for the AC utility power 35. In order to supply the necessary power to the load circuit 15, the AC power generated by the inverter unit 64 flows through to the closed contacts 38-1 and 38-2 of the bypass isolation circuit 26 and directly to the load circuit 15. When the monitor and control unit 10 senses that the voltage of the DC rechargeable energy source 57 has dropped below a predetermined lower limit the monitor and control unit 10 issues a signal to switch on the energy charger component 47. This cycle of monitoring and controlling continues on indefinitely and includes a solution to engage the bypass current path should the conditions of the system dictate.

The bypass current path of the electric power conservation system occurs through and between contacts 37-1, and 37-2 of the bypass isolation circuit 26. This operation can be initiated manually as well as automatically. During normal operation, when the manual bypass switch 11 is engaged (set to bypass position), coil contactor 36 becomes deenergized, and contact 36-1 opens and disconnects the utility power source from the energy conservation current path. Simultaneously, the monitor and control unit 10, through the use of the interconnecting cable 22, detects the status of the manual bypass switch and removes the stimulus signal from coil contactor 38, deenergizing it. Once coil contactor 38 becomes deenergized, contact 38-1 and contact 38-2 open and disconnect the energy conservation current path from the load circuit 15. With the manual bypass switch 11 engaged (set to bypass position), coil contactor 37 becomes energized and contact 37-1 and contact 37-2 close allowing the bypass current path to flow from the utility power source 35 directly to the load circuit 15, bypassing the components of the energy conservation current path.

In addition to the above, during normal operation if the monitor and control unit 10 determines that the energy conservation current path as well as any one of the components therein is not operating within the predetermined system requirements, then the stimulus signal supplied to toggle switch 70 is removed and the system supplies current to the load circuit 15 through the bypass current path.

While the embodiments of the present invention are disclosed in relation to load circuits that are connected to an utility 120 VAC power source, it will be apparent that the electric power conservation system disclosed herein may be incorporated into load circuits that derive its power from other power sources. Additionally, scalable systems can be installed at the service entry of residential, commercial, and industrial buildings. An even smaller system comprised of a charger circuit, a DC energy storage source, and an inverter can be integrated into appliances. Additionally, a stand alone system is contemplated that can be used between a single AC outlet within a residential, commercial, or industrial dwelling and equipment requiring power.

Figure 2:
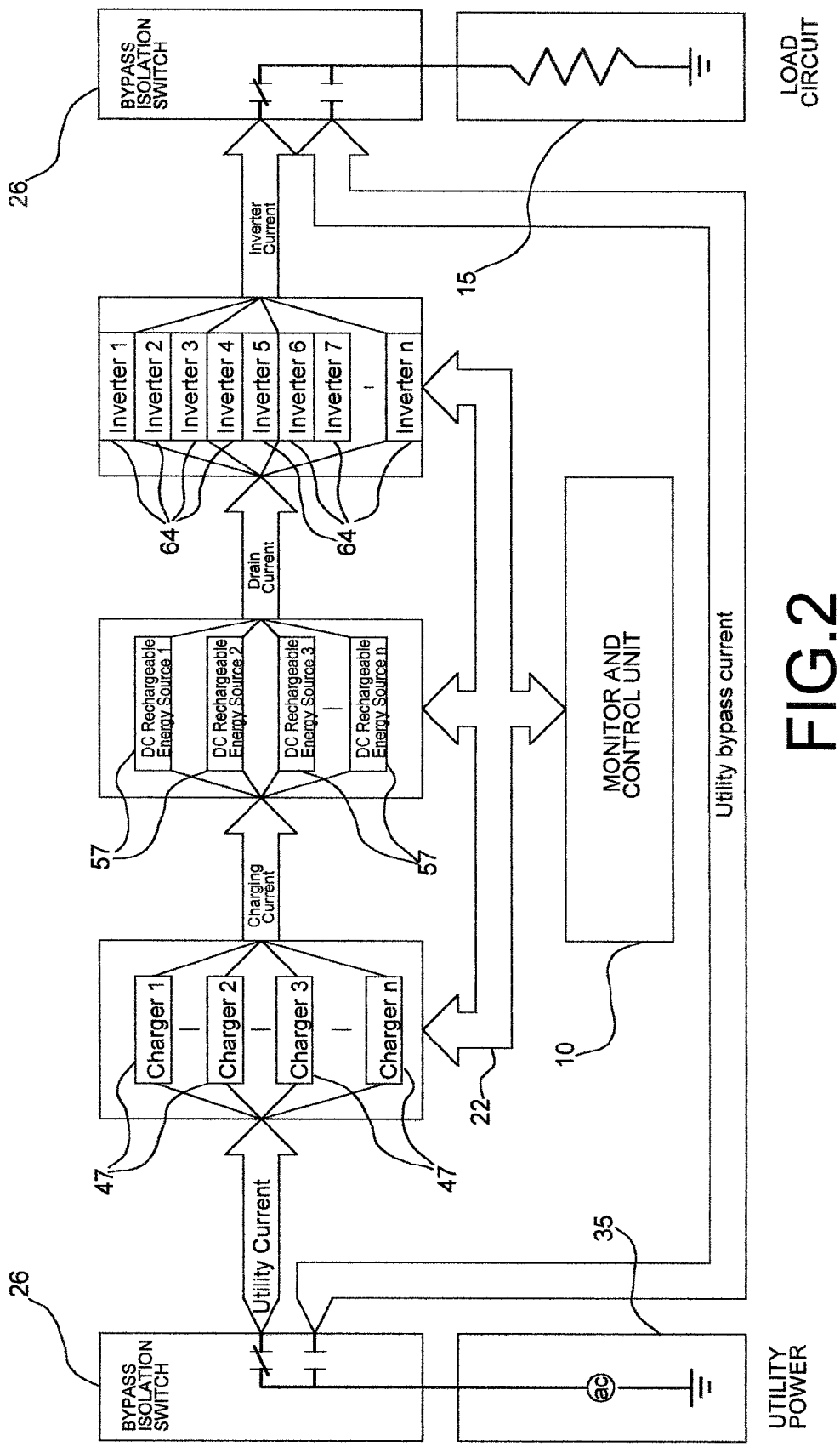
FIG. 2 is a schematic diagram of the second preferred embodiment the present invention.

FIG. 2 is a schematic diagram of the second preferred embodiment of the electric power conservation system in accordance with the principles of the present invention, that has additional element modules 47, 57 and 64 in order to increase overall capacity.

Figure 3:
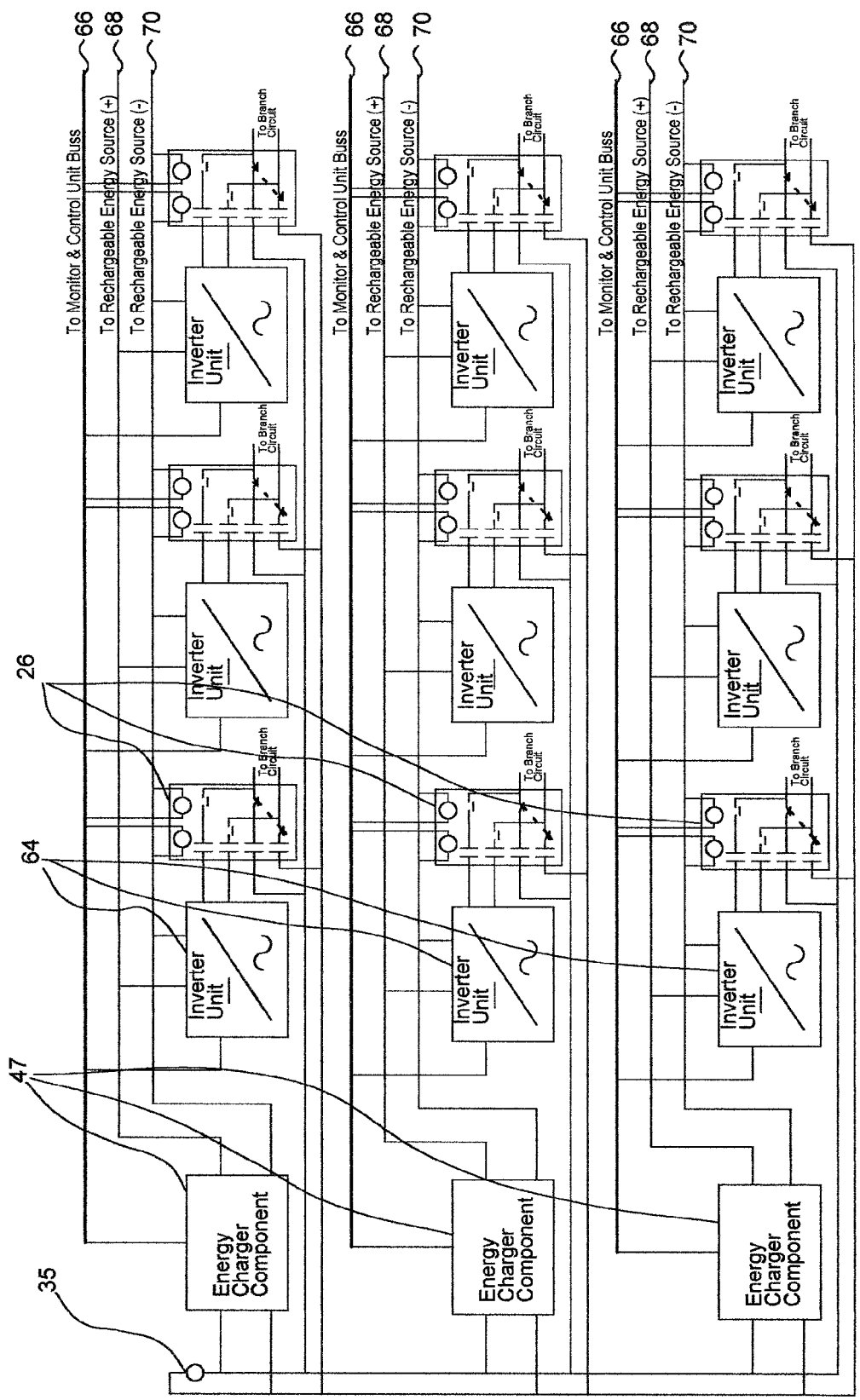
FIG. 3 is a schematic diagram of the third preferred embodiment of the present invention.

FIG. 3 is a schematic diagram of the third preferred embodiment of an electric power conservation system in accordance with the principles of the present invention, that conceptualizes how the invention will be arranged in replacement of existing feeder box type, branch circuit electrical wiring. Additionally, this same conceptional illustration shows a modular design, whereby a monitor and control unit, and a DC rechargeable energy source are remotely located (and not shown in FIG. 3). The monitor and control unit are connected by lines 66. The DC rechargeable energy source is connected by lines 68 and 70.

Figure 4:
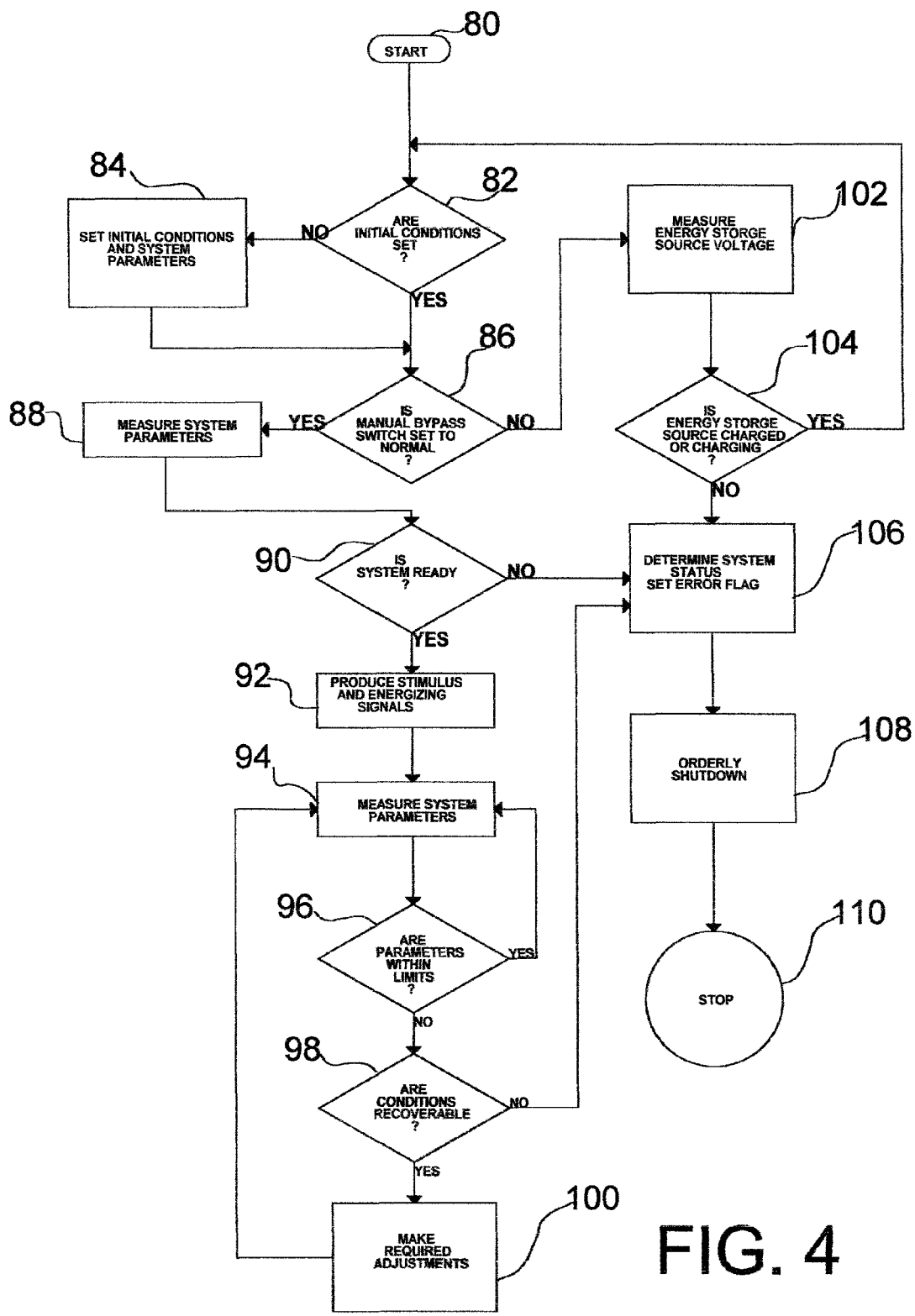
FIG. 4 is a flow chart of the method of conserving electric power, in accordance with the principles of the present invention.

FIG. 4 is a flow chart that conveys the method of conserving electric power in accordance with the principles of the present invention, which is systematically programmed to proceed in carrying out the interaction between the system elements to accomplish the purpose for which the system is designed. The method starts at 80. The system checks whether initial conditions are set 82. If not, then it sets initial conditions and system parameters 84. The system then checks whether the manual bypass is set to normal 86.

If it is set to normal, then the system measures system parameters 88. The system then checks whether it is ready 90. If it is ready, it then produces stimulus and energizing signals 92. If it is set to normal, then the system measures system parameters 88. The system then checks whether it is ready 90. If the system is not ready 90, it determines system status and sets an error flag 106 (see below). The system then proceeds to an orderly shutdown 108 and stops 110. If it is ready, it then produces stimulus and energizing signals 92. The system again measures its parameters 94. If the parameters are within limits 96, it again measures them 94. If the parameters are not within limits, it determines whether conditions are recoverable 98. If they are, then it makes required adjustments 100, and again measures its parameters 94. If conditions are not recoverable, it determines system status and sets an error flag 106 (see below).

If the manual bypass is not set to normal, then the system measures energy source voltage 102. If the energy storage source is charged or charging 104, then the system returns to the step just after start 80. If the energy storage source is not charged or charging, then the system determines system status and sets an error flag 106. The system then proceeds to an orderly shutdown 108 and stops 110.

It is to be understood that the present invention is not limited to the embodiments described above, but encompasses any and all embodiments within the scope of the following claims.

I claim:

1. An electric power conservation system for use between a primary power source and a load circuit, comprising:
    a) a bypass isolation means operable between a bypass current path and an energy conservation current path, for activating and deactivating the bypass current path and the energy conservation current path;
    b) a first contact means operable between open and closed conditions for providing an energizing current path for a first actuating means;

c) a second contact means operable between open and closed conditions for coupling bypass current from a primary power source to a load circuit;
d) the first actuating means, that actuates the second contact means, the first actuating means being connected between the primary power source and the first contact means;
e) a monitor and control means for responding to system conditions and load circuit requirements, and for producing stimulus signals to energize system circuitry, so as to minimize the power supplied by the primary power source;
f) a third contact means operable between open and closed conditions to provide an energizing current path for a second actuating means, the third contact means being connected between the second actuating means and the monitor and control means;
g) the second actuating means, that actuates the third contact means, the second actuating means being connected between the third contact means and a return connection of the primary power source;
h) an energy charger component for supplying sufficient charge to a direct current rechargeable energy source, the energy charger component being connected between the bypass isolation circuit and the direct current rechargeable energy source, and deriving power from the primary power source;
i) the direct current rechargeable energy source for supplying power to an inverter unit, the direct current rechargeable energy source connected between the energy charger component and the inverter unit, and the direct current rechargeable energy source providing power for the inverter unit and the monitor and control means;
j) the inverter unit, that supplies required power to the load circuit, the inverter unit being connected between the direct current rechargeable energy source and the bypass isolation means;
k) a fourth contact means operable between open and closed conditions for providing an energizing current path for a third actuating means, the fourth contact means connected between a second connection point and a primary power return;
l) a fifth contact means operable between open and closed conditions for coupling the primary power source to the energy charger component, the fifth contact means being connected between the primary power source and the energy charger component;
m) the third actuating means, that actuates the fifth contact means, the third actuating means being connected between the primary power source and a manual bypass means;
n) a sixth contact means operable between open and closed conditions for coupling the inverter unit to the load circuit;
o) a fourth actuating means for actuating the sixth contact means, the fourth actuating means being connected between the monitor and control means and the primary power return;
p) an arc suppressing means for suppressing any arcing that occurs when the contacts are manually switched between operating modes; and
p) a break-before-make means for insuring that separate current paths remain isolated during switching between operating modes.

2. The electric power conservation system for use between a primary power source and a load circuit, comprising:

a) a bypass isolation component operable between a bypass current path and an energy conservation current path, that activates and deactivates the bypass current path and the energy conservation current path;
b) a first contact operable between open and closed conditions for providing an energizing current path for a first actuator;
c) a second contact operable between open and closed conditions for coupling bypass current from a primary power source to a load circuit;
d) the first actuator, that actuates the second contact, the first actuator being connected between the primary power source and the first contact;
e) a monitor and control that responds to system conditions and load circuit requirements, and produces stimulus signals to energize system circuitry, thus minimizing the power supplied by the primary power source;
f) a third contact operable between open and closed conditions that provides an energizing current path for a second actuator, the third contact being connected between the second actuator and the monitor and control;
g) the second actuator, that actuates the third contact, the second actuator being connected between the third contact and a return connection of the primary power source;
h) an energy charger component for supplying sufficient charge to a direct current rechargeable energy source, the energy charger component being connected between the bypass isolation circuit and the direct current rechargeable energy source, and deriving power from the primary power source;
i) the direct current rechargeable energy source for supplying power to an inverter unit, the direct current rechargeable energy source connected between the energy charger component and the inverter unit, and the direct current rechargeable energy source providing power for the inverter unit and the monitor and control;
j) the inverter unit, that supplies required power to the load circuit, the inverter unit being connected between the direct current rechargeable energy source and the bypass isolation component;
k) a fourth contact operable between open and closed conditions for providing an energizing current path for a third actuator, the fourth contact connected between a second connection point and a primary power return;
l) a fifth contact operable between open and closed conditions for coupling the primary power source to the energy charger component, the fifth contact being connected between the primary power source and the energy charger component;
m) the third actuator, that actuates the fifth contact, the third actuator being connected between the primary power source and a manual bypass;
n) a sixth contact operable between open and closed conditions for coupling the inverter unit to the load circuit;
o) a fourth actuator for actuating the sixth contact, the fourth actuator being connected between the monitor and control and the primary power return;
p) an arc suppressor, that suppresses arcing when the contacts are manually switched between operating modes; and
q) a break-before-make component that isolates separate current paths during switching between operating modes.

3. A method for conserving electric power, comprising the steps of:

a) activating and deactivating a bypass current path and an energy conservation current path, using a bypass isolation component operable between the bypass current path and the energy conservation current path;
b) providing an energizing current path for a first actuator, using a first contact operable between open and closed conditions;
c) coupling a bypass current from a primary power source to a load circuit, using a second contact operable between open and closed conditions;
d) actuating the second contact using the first actuator, with the first actuator being connected between the primary power source and the first contact;
e) minimizing the power supplied by the primary power source, using a monitor and control that responds to system conditions and load circuit requirements, and produces stimulus signals to energize system circuitry;
f) provides an energizing current path for a second actuator, using a third contact operable between open and closed conditions that, the third contact being connected between the second actuator and the monitor and control;
g) actuating the third contact, using the second actuator, with the second actuator being connected between the third contact and a return connection of the primary power source;
h) suppressing arcing when the contacts are manually switched between operating modes, using an arc suppressor; and
i) isolating separate current paths during switching between operating modes, using a break-before-make component.

* * * * *